W. J. STILL.
FUEL INJECTOR.
APPLICATION FILED JULY 17, 1914.
1,262,400.
Patented Apr. 9, 1918.
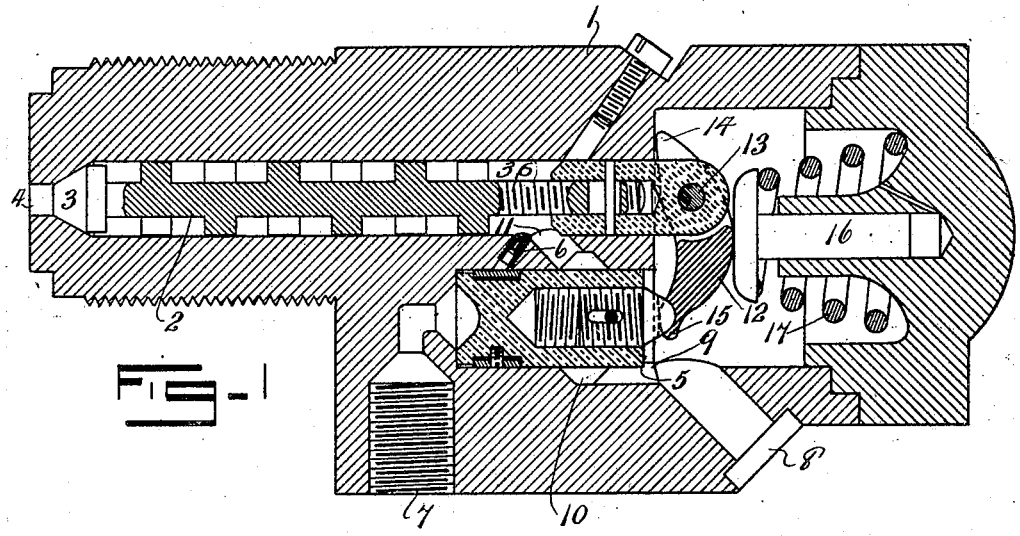
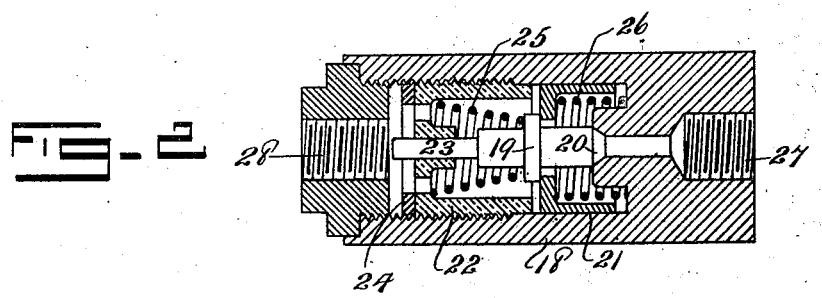

UNITED STATES PATENT OFFICE.

WILLIAM JOSEPH STILL, OF LONDON, ENGLAND.

FUEL-INJECTOR.

1,262,400.　　　　　Specification of Letters Patent.　　Patented Apr. 9, 1918.

Application filed July 17, 1914. Serial No. 851,583.

*To all whom it may concern:*

Be it known that I, WILLIAM JOSEPH STILL, a subject of the King of Great Britain, and a resident of London, England, have invented certain new and useful Improvements in Fuel-Injectors, of which the following is a specification.

This invention relates to an improved fuel valve for internal combustion engines and has for its object to provide a fuel valve which will insure a more perfect atomization of the oil delivered to the combustion chamber and will obviate dangerous pre-ignition by preventing leakage of oil into the cylinder at improper periods. A further object of my invention is to prevent the retention of admixtures of fuel and air within the valve between the injection and thus enable higher valve temperatures to be attained without carbonization within the valve passages.

The primary feature of the invention consists in providing a valve wherein a current of air passes through or over the fuel valve and into a combustion chamber when the valve is first opened, the air being supplied at a pressure greater than that within the cylinder, the fuel to be atomized is injected into this air current and the air supply is continued after the injection of fuel has ceased so as to insure the cleaning out of the valve passages.

According to further features of my invention the valve is operated by pressure from a fuel pump so timed as to deliver fuel during the required periods only.

In the accompanying drawings I have illustrated a valve constructed and arranged in accordance with my invention.

In these drawings Figure 1 is a sectional elevation, and Fig. 2 a sectional view of a special form of check valve which may in some cases be employed.

Referring to these drawings the numeral 1 designates the valve casing which is bored to receive the valve proper 2 having a conical end 3 which normally closes the ejection jet 4. Suitably located I provide a valve operating plunger 5 which also operates to control the flow of liquid fuel from the source of supply to the valve barrel by reason of the fact that it normally closes the fuel injection orifice 6. The valve 2 is connected to the cap to which the plunger 5 is attached by any suitable means as for instance a screw bolt and plate. The passage 7 is connected to the fuel supply and the fuel supply is delivered to this passage under pressure from a suitable pump operated by a cam or some other device driven by the engine and the operation of this pump is so timed as to deliver the liquid fuel to the passage 7 only at the required periods. The passage 8 leads from the compressed air supply, which may be derived from any suitable form of air compressor, the air passes from this passage 8 by way of the passage 9, an annular passage 10 and the orifice 11 to the valve barrel. A lever 12 is pivoted at 13 to the end of the valve 2 remote from the ejection jet and the end 14 of this lever fulcrums upon the casing 1 as shown and the other end 15 of this lever coöperates with the plunger 5 and a slight clearance is allowed between the lever and the plunger to insure the proper closing of the valve. A headed plunger 16 controlled by a spring 17 resists the movement of the lever 12 and the valve operating plunger 5.

The operation of the valve as a whole is as follows:—Liquid fuel under pressure is intermittently supplied to the passage 7 and this liquid operates to move the valve operating plunger 5 against the influence of the spring 17. The movement of the plunger 15 through the medium of the lever 12 operates the valve proper 2 and a stream of air immediately rushes out of the jet 4. When the plunger 5 has moved sufficiently the fuel injection orifice 6 is uncovered and liquid fuel passes through the orifice into the valve barrel and is moved with the air stream and the mixture is ejected from the jet 4 as will be readily understood.

In order to insure the more effective mixing of the fuel and air I may provide baffling devices in the form of toothed wheels 36 arranged side by side upon the valve spindle as shown. The delivering of fuel to the passage 7 ceases and the plunger 5 returns to its normal position and the fuel orifice is closed before the valve proper 2 closes so that air continues to pass through the valve after the fuel charge has been ejected and tends to clear the liquid fuel from the valve.

The valve 2 is closed both by spring and air pressure but the effective value of the latter is reduced at the correct period for its opening by the compression pressure inside cylinder, this makes it more readily opened at this time and more firmly shut at other times.

If through dirt under its seat, or other causes, the valve 2 should leak, oil will even then be injected into the cylinder only at or about the proper period.

This is provided for in a two-fold manner, first (in the normal condition of the jet) the port 6 is still, despite the leaky condition of the valve 2, held closed except during the proper injection periods by the piston 5 and thus the leak into the cylinder between these periods is of air only.

Secondly should the piston 5 jam (a far more improbable condition) and hold both valve 2 and piston 5 open oil can still only be injected into the air current passing the orifice 6 during the delivery stroke of the oil pump and this corresponds to the injection period.

It is therefore evident that a fuel valve constructed in accordance with my invention provides a means of avoiding the continuous injection of atomized fuel into the cylinder as the result of a leaky fuel valve thus avoiding the danger caused by compressing a combustible instead of an inert charge.

The oil pump may be provided with a suction valve only the oil piston 5 acting as a delivering valve, or a special lost motion valve may be fitted to the oil pump of such a form that it allows of the return of a proportion of the oil delivered through it back into the pump before closing. A convenient form of valve is illustrated in Fig. 2.

The check valve shown in Fig. 2 displaces the ordinary check valve which is now employed on the delivery side of the feed-pump. The ordinary check valve would, if employed in this instance, prevent the return of the piston and consequently that of the valve 2 to the position in which it is shown by the imprisonment of liquid between it and the piston. The check valve shown in Fig. 2 is provided with a lost motion device which allows the piston 5 to return.

This valve comprises essentially a casing 18, a double valve 19, 20, a hollow piston 21, a hollow plug 22 serving as a stop for the piston 21 and as a guide for the tail 23 of the valve 19, 20, this plug screwing into the casing 18, a locking ring 24 and two springs 25 and 26.

The right hand port 27 of this valve is coupled to the delivery pipe of the feed-pump and the left hand port 28 to the port 7 of the fuel valve by a pipe. The oil delivered by the pump lifts the valve 20 off its seating, the piston 21 following the valve 19 under the influence of the spring 26 until it is arrested by the plug 22. As soon as the piston 21 is arrested, the valve 19 is lifted and the oil has a clear passage. As soon as the delivery from the pump ceases the valve 19 seats upon the piston and thus prevents any back-flow of liquid. During the suction stroke of the pump the forces acting on the piston 21 are unbalanced. Consequently it is driven, by the superior force of the spring 25 acting on the piston and the imprisoned liquid, to the right until some of the oil is withdrawn from the pipe leading to part 7 and the valve 2 becomes seated.

The dimensions of the valve 20 are such that, during perfect working, it does not become seated but stops slightly clear of its seat. If there should be some air in the oil, however as soon as an air bubble is formed on the delivery side of the check valve, thus rendering the fuel capable of expanding, the valve 20 seats during each suction stroke of the pump, thus checking any possible back-flow past the valve 19.

The duration of time and therefore the degree of air sweeping done at opening of valve and also at closing can be controlled by the position of the port and shape of the cam driving the oil pump, the latter control will modify the comparative duration of the opening and closing periods.

It will be understood that the particular construction of fuel valve hereinbefore described and illustrated is given by way of example and may be varied in many details within the scope of the claim.

What I claim and desire to secure by Letters Patent is:—

An apparatus for injecting liquid fuel into a gas engine comprising in combination a casing having a jet opening and an air passage leading thereto, a valve member for normally closing said jet opening and arranged in said passage, said casing having a fuel orifice leading into said passage, a plunger adapted to be operated by the pressure of the liquid fuel and normally closing said fuel orifice, a lever for transmitting motion from said plunger to said valve member to open the valve, and a check valve for the fuel pump adapted to relieve the pressure behind said piston upon the intake stroke of the fuel pump whereby said piston is free to assume the position to cut off the said orifice.

In testimony whereof I affix my signature in presence of two witnesses.

WILLIAM JOSEPH STILL.

Witnesses:
EDWARD A. EOE,
H. D. JAMESON.